United States Patent
Wiggins et al.

(10) Patent No.: US 9,260,169 B2
(45) Date of Patent: Feb. 16, 2016

(54) CONCENTRIC CUTTING ASSEMBLY, CONCENTRIC CUTTING SYSTEMS, AND NET PENETRATION METHOD

(71) Applicant: Adaptive Methods, Inc., Rockville, MD (US)

(72) Inventors: Jim Wiggins, Thurmont, MD (US); Conrad Zeglin, Rockville, MD (US); Walter Allensworth, Poolesville, MD (US)

(73) Assignee: Adaptive Methods, Inc., Rockville, MD (US)

( * ) Notice: Subject to any disclaimer, the term of this patent is extended or adjusted under 35 U.S.C. 154(b) by 0 days.

(21) Appl. No.: 14/720,057

(22) Filed: May 22, 2015

(65) Prior Publication Data

US 2015/0251740 A1    Sep. 10, 2015

Related U.S. Application Data

(60) Continuation of application No. 14/593,718, filed on Jan. 9, 2015, now Pat. No. 9,061,361, which is a division of application No. 14/156,697, filed on Jan. 16, 2014, now Pat. No. 8,961,079, which is a division of application No. 12/497,285, filed on Jul. 2, 2009, now Pat. No. 8,714,889.

(51) Int. Cl.
| | |
|---|---|
| *B63G 8/00* | (2006.01) |
| *B26D 1/20* | (2006.01) |
| *F42B 12/02* | (2006.01) |
| *F42B 19/00* | (2006.01) |
| *B23D 57/00* | (2006.01) |
| *B63G 8/39* | (2006.01) |

(52) U.S. Cl.
CPC ............ *B63G 8/001* (2013.01); *B23D 57/0084* (2013.01); *B26D 1/20* (2013.01); *B63G 8/39* (2013.01); *F42B 12/02* (2013.01); *F42B 19/005* (2013.01); *B63G 2008/002* (2013.01); *Y10T 83/04* (2015.04); *Y10T 83/0481* (2015.04); *Y10T 83/7863* (2015.04); *Y10T 83/9321* (2015.04); *Y10T 83/9399* (2015.04); *Y10T 83/9401* (2015.04); *Y10T 408/895* (2015.01)

(58) Field of Classification Search
USPC .......................... 114/313, 20.3, 1, 20.1, 312
See application file for complete search history.

(56) References Cited

U.S. PATENT DOCUMENTS

| | | |
|---|---|---|
| 1,931,772 A | 10/1933 | Simpson et al. |
| 3,701,331 A | 10/1972 | Harris, Jr. |
| 3,760,673 A | 9/1973 | Peterson, Jr. |

(Continued)

*Primary Examiner* — J. Woodrow Eldred
(74) *Attorney, Agent, or Firm* — Dickstein Shapiro LLP

(57) ABSTRACT

The problem of penetrating through nets and other objects is solved by cutting the object using concentric cutters in which a rotatable cutter having floating teeth rotates concentrically about a stationary cutter having fixed teeth. The object is cut by a severing action caused by the floating teeth of the rotatable cutter sliding against the fixed teeth of the stationary cutter. Embodiments of the invention include a UUV system for penetrating through fishing nets and other objects, concentric cutting assemblies for use in the UUV system and other systems, and a method for penetrating through fishing nets and other objects. A UUV system in accordance with an embodiment of the invention has a concentric cutting assembly at the forward end and a propulsor at the aft end. The concentric cutting assembly integrates seamlessly within the UUV housing and is deployed from the forward end of the UUV, enabling the UUV to quickly and efficiently penetrate through objects blocking its path.

20 Claims, 7 Drawing Sheets

(56) References Cited

U.S. PATENT DOCUMENTS

| | | |
|---|---|---|
| 3,842,770 A | 10/1974 | Hedbawny et al. |
| 4,016,728 A | 4/1977 | Mason |
| 4,722,667 A | 2/1988 | Rikhy et al. |
| 4,954,108 A | 9/1990 | Govan |
| 5,191,819 A | 3/1993 | Hoshi |
| 5,419,272 A * | 5/1995 | Backstein et al. ........ 114/221 A |
| 6,007,279 A | 12/1999 | Malone |
| 6,401,706 B1 | 6/2002 | Hernblom et al. |
| 6,834,433 B1 | 12/2004 | Dingus |
| 8,899,167 B2 * | 12/2014 | Wiggins et al. ........... 114/221 A |
| 2006/0285934 A1 | 12/2006 | Keightley |
| 2007/0036620 A1 | 2/2007 | Keightley |
| 2012/0155979 A1 | 6/2012 | Khangar et al. |
| 2012/0191121 A1 | 7/2012 | Chen et al. |

* cited by examiner

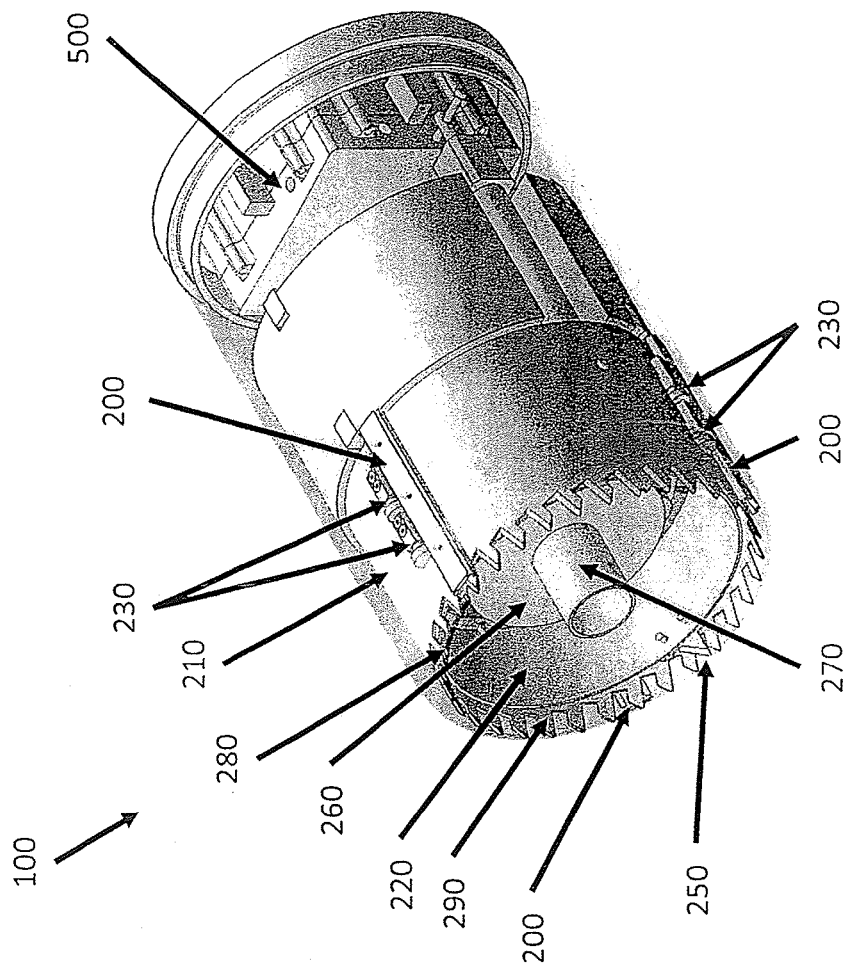
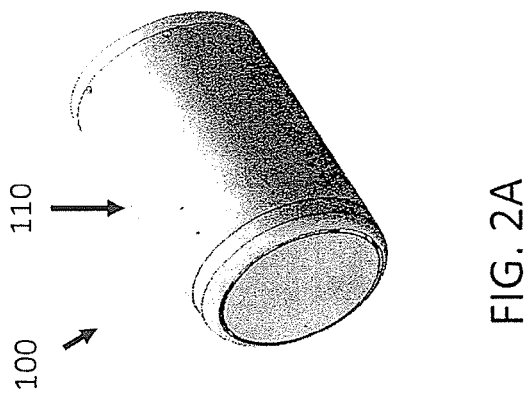

CONCENTRIC CUTTING ASSEMBLY, CONCENTRIC CUTTING SYSTEMS, AND NET PENETRATION METHOD

CROSS-REFERENCE TO RELATED APPLICATIONS

This application is a continuation of U.S. patent application Ser. No. 14/593,718, filed Jan. 9, 2015, which is a divisional of U.S. patent application Ser. No. 14/156,697, filed on Jan. 16, 2014, which is a divisional of U.S. patent application Ser. No. 12/497,285, filed on Jul. 2, 2009, the subject matter of each of which are incorporated in their entirety by reference herein.

FIELD OF THE INVENTION

The invention relates generally to a cutting assembly, and in particular to a system, method, and apparatus for cutting nets and other objects.

BACKGROUND

The use of fishing nets and other objects in water bodies can present a significant obstacle to marine vessels and underwater vehicles, especially in littoral zones where fishing activity is concentrated. Marine vessels and underwater vehicles can encounter fishing nets in a variety of orientations and tensions. Some nets are constructed with a light monofilament line and have simple square patterns. Other nets are constructed with a heavy, braided line and have complex patterns. Nets can also be anchored and tightly strung, be loose and compliant, or float with weights distributed on the bottom.

Unmanned underwater vehicles (UUVs) have contributed greatly to the gathering of information in harbors and littoral waters where other underwater vehicles such as submarines cannot travel or be easily detected. For example, UUVs can carry out critical missions in the areas of intelligence, surveillance, reconnaissance, mine countermeasures, tactical oceanography, navigation and anti-submarine warfare. Mission performances, however, have been hindered by UUVs' inability to penetrate through fishing nets and other objects while traveling underwater.

Presently, UUV mission areas are scanned for fishing nets and other objects. Mission routes are selected so as to minimize the probability of encountering objects even though the selected route may not be the shortest or the most desired route. Yet, UUVs may be called upon during mission critical situations to penetrate waters in which there is a high probability of encountering fishing nets and other objects. In these situations, a UUV may be forced to stop and maneuver around obstacles encountered during its mission. If a UUV gets entangled in a fishing net, divers may be required to retrieve the UUV and cause significant operation delay. Operation failure may result if the UUV is not retrievable or lost altogether.

Accordingly, there is a need and desire for an apparatus, system and method for easily and quickly penetrating through nets and other objects.

BRIEF DESCRIPTION OF THE DRAWINGS

FIG. 2A is an external view of a concentric cutting assembly in accordance with an embodiment described herein.

FIG. 2B is an internal view of a concentric cutting assembly in accordance with an embodiment described herein.

DETAILED DESCRIPTION OF THE INVENTION

Figure 1:
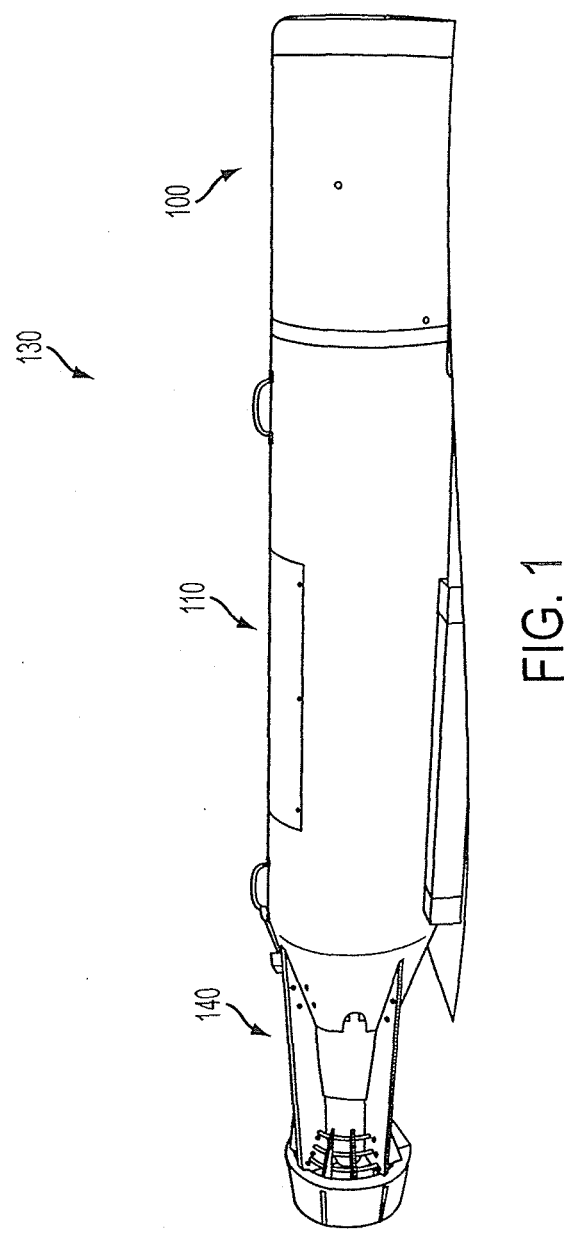
FIG. 1 is a diagram of a UUV system in accordance with an embodiment described herein.

In the following detailed description, reference is made to the accompanying drawings, which form a part hereof and illustrate specific embodiments that may be practiced. In the drawings, like reference numerals describe substantially similar components throughout the several views. These embodiments are described in sufficient detail to enable those skilled in the art to practice them, and it is to be understood that structural and logical changes may be made. Sequences of steps are not limited to those set forth herein and may be changed or reordered, with the exception of steps necessarily occurring in a certain order.

The problem of penetrating through nets and other objects is solved by cutting the object using concentric cutters in which a rotatable cutter having floating teeth rotates concentrically about a non-rotatable cutter having fixed teeth. The object is cut by a severing action caused by the floating teeth of the rotatable cutter sliding against the fixed teeth of the non-rotatable cutter.

Disclosed embodiments include a system for penetrating through fishing nets and other objects, as well as various apparatuses including a concentric cutting assembly for use in this system. Embodiments of the concentric cutting assembly include an inside cutter rotating concentrically within an outside cutter, the inside cutter having floating teeth that slide against teeth fixed to the outside cutter. Further, disclosed embodiments include methods for penetrating through fishing nets and other objects.

The invention may be used to particular advantage in the context of underwater vehicles traveling in areas with high fishing activity. Therefore, the following example embodiments are disclosed in the context of UUV systems. However, it will be appreciated that those skilled in the art will be able to incorporate the invention into numerous other alternative systems that, while not shown or described herein, embody the principles of the invention.

FIG. 1 shows a UUV system 130 in accordance with an embodiment described herein. UUV 130 is integrated with a concentric cutting assembly 100 at the forward end and a propulsor 140 at the aft end. UUV 130 may be, for example, a modified ANT Glider Eyak 01 developed by Alaska Native Technologies, LLC or a modified Remus 600 developed by Hydroid, Inc. In accordance with an advantageous feature of this disclosed embodiment, concentric cutting assembly 100 integrates seamlessly within UUV housing 110 as can be seen in FIG. 1. Seamless integration of concentric cutting assembly 100 has the effect of minimizing drag as UUV 130 moves underwater and the effect of minimizing the power required for concentric cutting assembly 100 to penetrate through nets and other objects. In accordance with another advantageous feature of this disclosed embodiment, concentric cutting assembly 100 is deployed from the forward end of UUV 130, thus, enabling UUV 130 to quickly and efficiently penetrate through objects blocking its path.

FIG. 2A is an external view of concentric cutting assembly 100 integrated into UUV 130 in accordance with the embodiment depicted in FIG. 1. FIG. 2B is an internal view showing the components inside concentric cutting assembly 100 in accordance with the embodiment depicted in FIG. 2A. Concentric cutting assembly 100 includes two concentric cutters: non-rotatable cutter 280 and rotatable cutter 290. Non-rotatable cutter 280 can be a composite cutter comprising outer cylinder 210 and fixed teeth 240. Rotatable cutter 290 comprises inner cylinder 220 and floating teeth 250.

Slide rails 200 are attached to the inside of UUV housing 110 as shown in FIG. 2B. Concentric cutters 280 and 290 move back and forth along slide rails 200. Concentric cutters 280 and 290 move forward along slide rails 200 to engage and cut fishing nets and other objects encountered by UUV 130 during a mission. After the object is cut, concentric cutters 280 and 290 retract along slide rails 200 into their original position inside UUV housing 110. Three slide rails 200 are used in the example embodiment of FIG. 2B. If desired, particular embodiments may optionally include only two slide rails, more than three slide rails, or any other means for extending and retracting concentric cutters 280 and 290. Those skilled in the art will appreciate that alternative embodiments may employ roller bearings instead of slide rails. The roller bearings can be contained within slots to prevent rotation of non-rotatable cutter 280.

Outer cylinder 210 is mounted on slide rails 200. Inner cylinder 220 rotates concentrically within outer cylinder 210. Six bearing plates 230 are mounted to outer cylinder 210 (four of which are visible in FIG. 2B). Bearing plates 230 serve two main purposes: (1) to keep concentric cylinders 210 and 220 axially aligned and (2) to keep floating teeth 250 in constant contact with fixed teeth 240. Each bearing plate 230 can be adjusted in depth and tilt. If desired, particular embodiments may optionally mount bearing plates 230 to inner cylinder 220. Any desired number of bearing plates may optionally be used, however, the present inventors have found that six bearing plates are effective in axially aligning concentric cylinders 210 and 220.

Concentric cylinders 210 and 220 of the disclosed embodiment are made of carbon fiber, however, cylinders 210 and 220 can be made of any other material with properties similar to carbon fiber, such as, for example, titanium, stainless steel and carbon steel. The present inventors have found that carbon fiber is sufficiently strong to be used for penetrating nets and other objects and can be easily fabricated.

As shown in FIG. 2B, outer cylinder 210 can be formed with fixed teeth 240 protruding from one end in a direction parallel to the center axis of outer cylinder 210. Fixed teeth 240 are each formed as blades having substantially the same angled cutting edge as each other. According to the embodiment of FIG. 2B, thirty-six fixed teeth 240 are evenly spaced about outer cylinder 210. A cutting assembly embodying the principles of the invention can have any desired number of fixed teeth, however. Moreover, the fixed teeth can each have different shapes than shown, as is known in the art.

In accordance with an advantageous feature of the disclosed embodiment, three floating teeth 250 are spring-mounted about one end of the outer surface of inner cylinder 220. Similar to fixed teeth 240, floating teeth 250 are formed as blades and have substantially the same angled cutting edge as each other. Further, floating teeth 250 extend from inner cylinder 220 along the same direction as fixed teeth 240 such that the blades of floating teeth 250 are parallel to the blades of fixed teeth 240.

The present inventors have discovered that three floating teeth are effective at severing nets and other objects. Using a reduced number of floating teeth, compared to the number of fixed teeth, has two important benefits. First, a reduced number of floating teeth reduces the surface contact area formed by the floating teeth sliding against the fixed teeth, which produces less sliding friction between the cutting surfaces. Less sliding friction requires less torque and, thus, less power is required to run concentric cutting assembly 100. Second, peak power consumption is minimized because the three floating teeth 250 can be positioned around inner cylinder 220 such that no two pairs of floating teeth and fixed teeth are ever cutting at the same time.

Fixed teeth 240 and floating teeth 250 are fabricated from stainless steel in the embodiment of FIG. 2B. If desired, particular embodiments may optionally fabricate teeth from titanium, carbon steel, or any other metal with properties similar to stainless steel. The inventors found that galling can roughen the contact areas between fixed teeth 240 and floating teeth 250 after repeated use of concentric cutting assembly 100. A lubricant such as AntiSeeze lube may optionally be placed between the cutting surfaces to prevent material transferring from one surface to the other surface and to reduce friction. Alternatively, a cutting surface may be coated with a hardened material such as titanium nitride (TiN), titanium aluminum nitride (TiAN) or titanium carbon nitride (TiCN) to prevent material transfer. In addition, an anti-friction coating such as molybdenum sulfite (MoST) may be optionally placed over the hardened material to reduce friction.

If UUV 130 does not have its own neutral buoyancy mechanism, particular embodiments may optionally include foam 260 for neutral buoyancy. Foam 260 can be positioned in the center of inner cylinder 220 around center pipe 270. If desired, foam 260 can alternatively be positioned in the rear of concentric cutting assembly 100 if UUV 130 has a forward looking sonar located in the center of inner cylinder 220.

Figure 3:
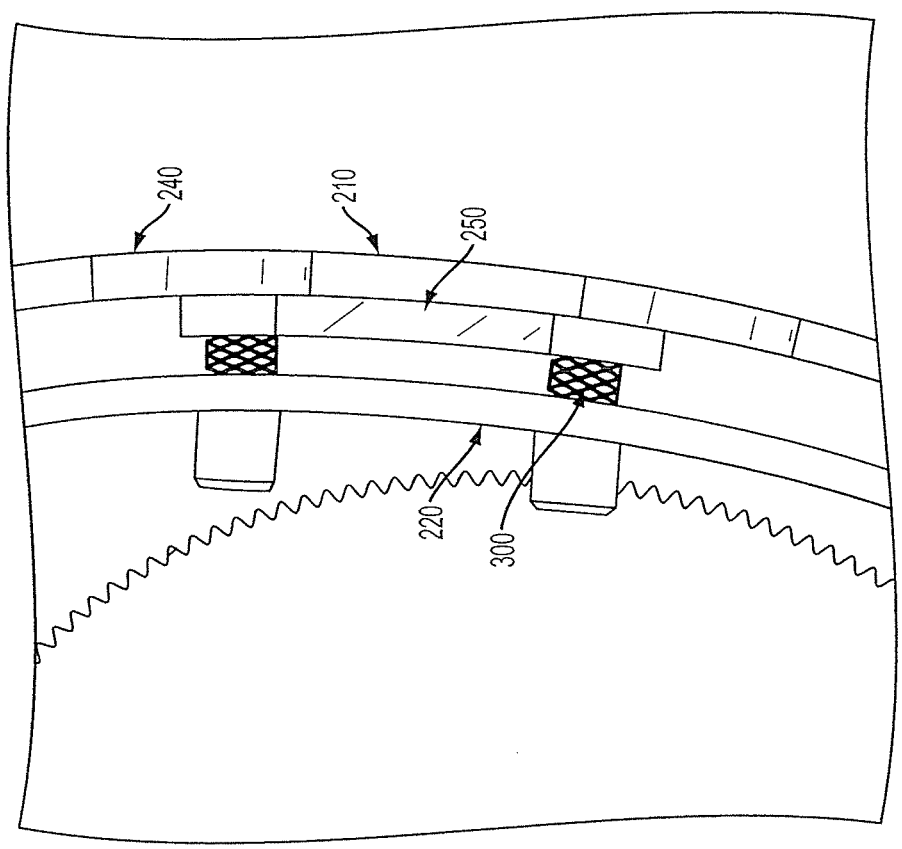
FIG. 3 is a profile view of a concentric cutting assembly in accordance with an embodiment described herein.

FIG. 3 is a profile view of concentric cutting assembly 100 in accordance with the embodiment disclosed in FIG. 2B. In accordance with an advantageous feature of the disclosed embodiment, concentric cutting assembly 100 includes two thin-walled concentric cutters 280 and 290. A thinly profiled concentric cutting assembly 100 allows it to fit tightly between UUV housing 110 and a forward looking sonar, if one exists in UUV 130. Although concentric cutting assembly 100 is less than one inch thick in this example embodiment, it can be readily appreciated that the thickness of concentric cutting assembly 100 can be adjusted based on the space constraints of the particular UUV system and other alternative systems.

In accordance with another illustrative feature of the disclosed embodiment, floating teeth 250 are mounted to inner cylinder 220 using low profile springs 300. Wavy springs such as those manufactured by Smalley Steel Ring Company can be used to keep the cutting assembly profile narrow. The inventors have found that mounting floating teeth 250 to inner cylinder 220 using springs 300 provide three main benefits.

First, springs 300 keep the cutting surfaces formed by floating teeth 250 and fixed teeth 240 tightly together. Tight cutting surfaces facilitate quick and efficient cutting of nets and other objects. Second, springs 300 keep cylinders 210 and 220 tightly against each other. Third, spring-mounted floating teeth 250 act like another set of bearings to keep concentric cylinders 210 and 220 evenly apart and axially aligned.

It will be appreciated that the size and shape of floating teeth 250 and fixed teeth 240 are not limited to the example embodiment depicted in FIGS. 2 and 3. In fact, any size and shape of floating teeth 250 and fixed teeth 240 can be used so long as each floating tooth 250 creates a bi-directional shearing action when sliding against fixed teeth 240. Preferably, the blades of fixed teeth 240 have the same or substantially the same cutting angle. The present inventors have found that blades with a 30 to 70 degree angle, preferably a 55 degree angle, are effective at cutting nets and other objects. It will be appreciated that the cutting angle may need to be adjusted based on the objects to be penetrated. For instance, blades with wide cutting angles are more effective at cutting through thick fishing nets than blades with narrower cutting angles. Moreover, the shearing action is more effective if the cutting surface consists of the entire edge of the blade. The present inventors have also discovered that fixed teeth 240 with rounded tips have the advantageous features of capturing and holding the net in place while also preventing the rounded tips from catching on the net itself as rotatable cutter 290 rotates to cut the object. In contrast, floating teeth 250 preferably have pointed tips for more effective cutting.

Another advantageous feature of the disclosed embodiment is that rotatable cutter 290 is free floating—supported only by means that keep it axially aligned with non-rotatable cutter 280. In the example embodiment depicted in FIGS. 2 and 3, non-rotatable cutter 280 is cylindrical conforming to the shape of UUV housing 110 in order for concentric cutting assembly 100 to seamlessly integrate with UUV 130. However, it will be appreciated that rotatable cutter 290 may be shaped other than as a cylinder. If desired, particular embodiments may optionally include a rotatable cutter shaped as an equilateral triangle, square, Y-shaped, pentagon, or any other shape so long as the rotatable cutter can rotate concentrically within non-rotatable cutter 280 and be mounted with at least one floating tooth.

If desired, non-rotatable cutter 280 can have a non-cylindrical shape in systems in which the non-rotatable cutter does not have to conform to the cylindrical shape of UUV system 130. In an alternative embodiment, for example, the concentric cutters can be comprised of two concentric equilateral triangles in which one, two, or three floating teeth are mounted to a respective corner of the rotatable triangular cutter, and bearing plates are aligned with the floating teeth for axially aligning the concentric cutters. In yet another alternative embodiment, the concentric cutters can be comprised of two concentric squares with one to four floating teeth mounted to a respective corner of the rotatable square cutter. It will be appreciated by those skilled in the art that a rotatable cutter embodying the principles of the invention can be any shape as long as it can rotate concentrically about a non-rotatable cutter and has at least one floating tooth that is kept tightly against at least one tooth fixed to the non-rotatable cutter.

Rotatable cutter 290 can rotate clockwise or counter clockwise continuously in one direction. Those skilled in the art will appreciate that the direction of rotation does not matter as long as floating teeth 250 slide against fixed teeth 240 to create a shearing action that cuts fishing nets and other objects. In an alternative embodiment, rotatable cutter 290 can be configured to rotate in both directions. For instance, rotatable cutter 290 can alternate rotating clockwise and counter clockwise for a pre-determined time period.

Figure 4:
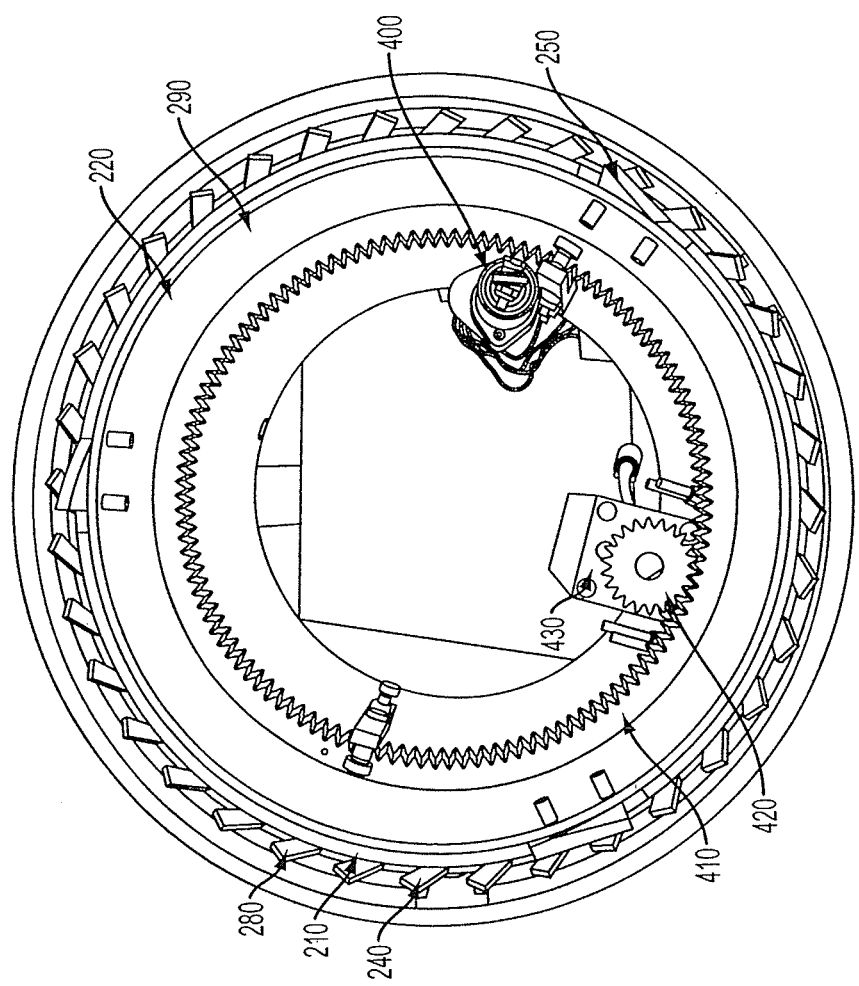
FIG. 4 shows an inside view of a concentric cutting assembly in accordance with an embodiment described herein.

FIG. 4 shows an inside view of concentric cutting assembly 100 in accordance with an embodiment described herein. A motor system housed within motor housing 430 provides the means to rotate inner cylinder 220. The motor system may be, for example, the Maxon RE 40 brushed motor equipped with a planetary gearhead such as a Maxon GP 42 gearhead. By mounting motor housing 430 to outer cylinder 210, rotatable cutter 290 can start rotating at any position with respect to non-rotatable cutter 280 and gain momentum before concentric cutting assembly 100 contacts an object. Spur gear 420 is mounted to the output shaft of the planetary gearhead and mates with internal ring gear 410, which is mounted to inner cylinder 220.

Actuator 400 moves concentric cutters 280 and 290 forward through UUV housing 110 to penetrate nets and other objects and retracts concentric cutters 280 and 290 after penetration. Actuator 400 may be, for example, a Firgelli Automations model ZYJ 05-11-12-3, which has a stroke length of 3" and can move from fully retracted to fully extended in 1.5 seconds and provide up to 50 lbs of actuation force to outer cylinder 210. Alternatively, an Ultra Motion Digit HT17 High-Torque NEMA 17 stepper motor actuator (Part No. D-A.083-HT17-4-2NO-RBC4S/RBC4S-SUW), which has comparable speed to the Firgelli actuator, can be used to supply up to 40 lbs of actuation force to outer cylinder 210. One contact point of actuator 400 is mounted to outer cylinder 210 while the other contact point of actuator 400 is mounted on the inside of UUV housing 110 as shown in FIG. 4. If desired, particular embodiments may optionally include multiple actuators without significantly increasing the profile or thickness of concentric cutting assembly 100. The multiple actuators can be placed radially about outer cylinder 210 and UUV housing 110.

Concentric cutting assembly 100 requires a power source and a speed signal to operate. Both the power source and the speed signal can be supplied by or be provided completely independent of UUV 130.

Figure 5:
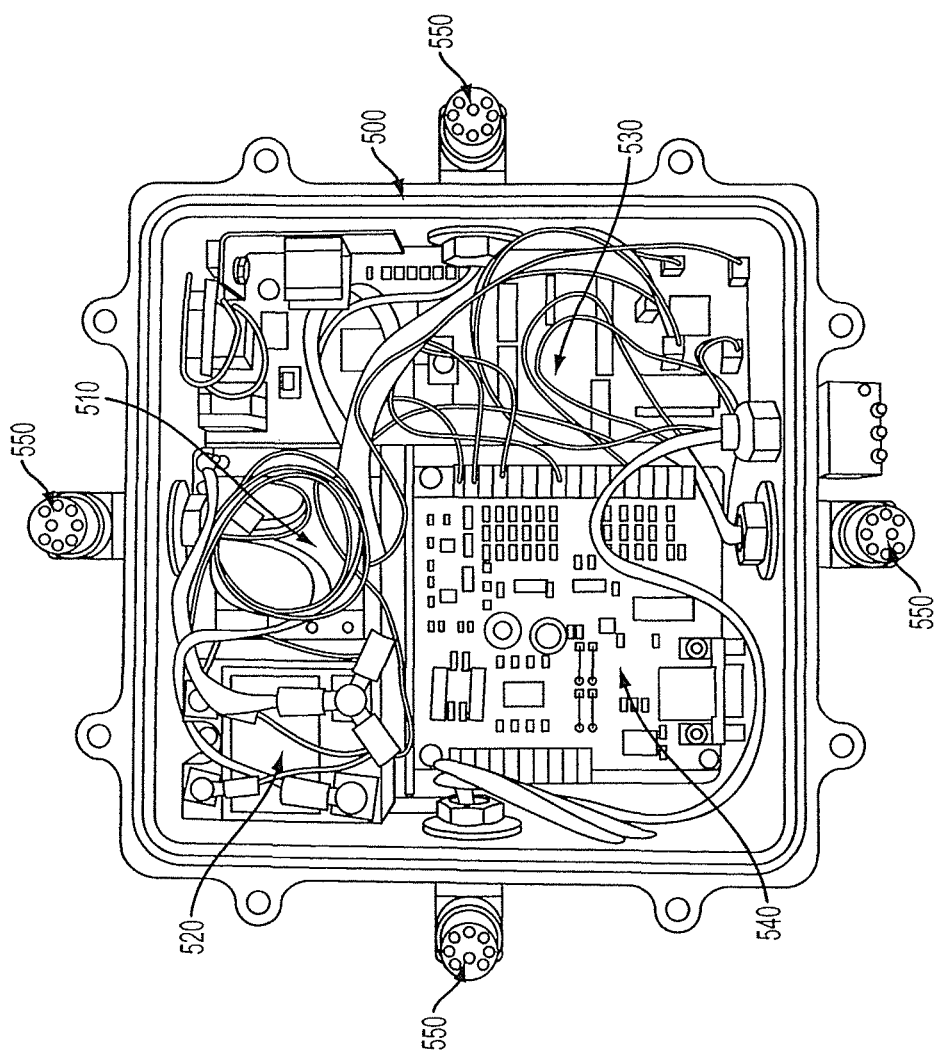
FIG. 5 is a schematic diagram of an electronic assembly of a concentric cutting assembly in accordance with an embodiment described herein.

FIG. 5 is a schematic diagram of an electronic assembly of concentric cutting assembly 100 in accordance with an embodiment described herein. Power is required to run the electronics housed in electronics housing 500. Concentric cutting assembly 100 can be configured to utilize the battery typically used by UUV 130 to power propulsor 140 to power its own electronics. Electronics housing 500 contains microcontroller 530, DC-DC converter 510, motor relay 520 and actuator controller 540. As shown in FIG. 2B, UUV housing 110 has a recess at the rear of concentric cutting assembly 100. This recess is deep enough to fit electronics housing 500.

Microcontroller 530 controls concentric cutting assembly 100 functions including setting a cutter deployment speed for the speed at which concentric cutters 280 and 290 are deployed, a cutter run time for the length of time that rotatable cutter 290 rotates at full speed, and a cutter retrieval time for the length of time it takes to retract concentric cutters 280 and 290 after cutting.

Preferably, components such as motor housing 430, actuator 400 and electronics housing 500 are made waterproof. In this disclosed embodiment, actuator 400 is waterproofed using a silicone rubber boot. Further, motor housing 430 is machined from PVC with a double "O" ring shaft seal. All housing joints are double sealed to protect against water infiltration. Surrounding electronics housing 500 are four waterproof connectors 550. One waterproof connector is located on each side of electronics housing 500.

Figure 6:
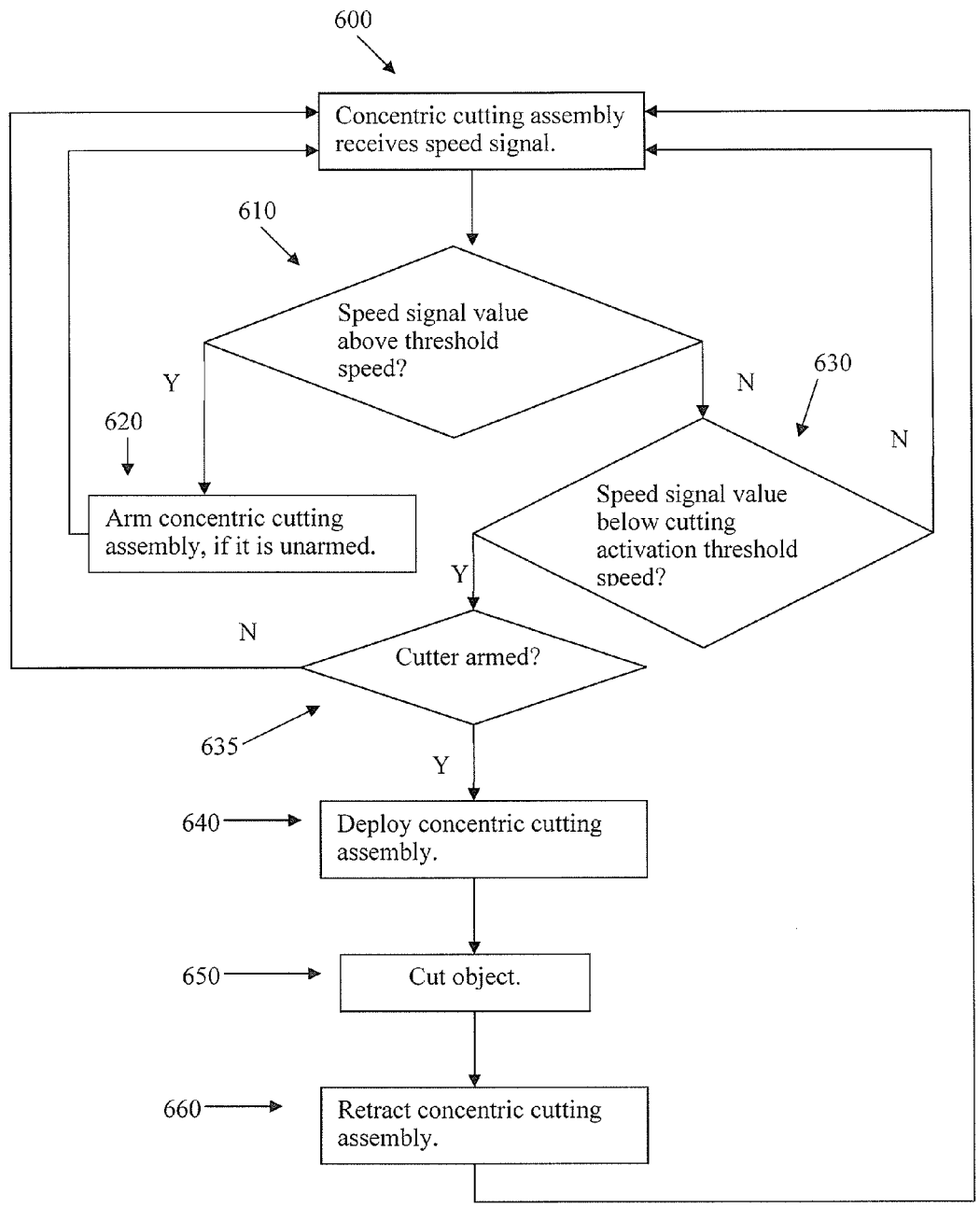
FIG. 6 is a flow chart of a method for penetrating through a net in accordance with an embodiment described herein.

FIG. 6 is a flow chart of a method for penetrating through a fishing net in accordance with an embodiment described herein. At step 600, microcontroller 530 waits for a speed signal from UUV 130. It should be appreciated by those skilled in the art that the speed signal can be generated by UUV 130 using any known method of speed detection. Speed sensors such as a pressure switch or a paddle wheel can be used to measure the speed at which UUV 130 is traveling.

According to the disclosed embodiment, UUV 130 is configured to travel at 3.0 knots when carrying out a mission. An arming threshold speed can be set at any speed between 0 and 3 knots, preferably 2.5 knots, for the purpose of determining when to arm concentric cutting assembly 100.

Figure 7A:
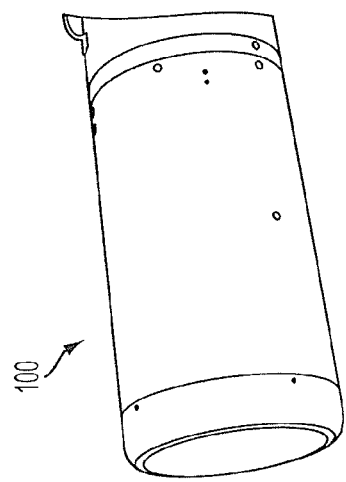
FIG. 7A illustrates a concentric cutting assembly in an armed state in accordance with an embodiment described herein.

Upon receiving a speed signal from UUV 130, microcontroller 530 determines at step 610 whether UUV 130 is traveling at a speed above the arming threshold speed. Concentric cutting assembly 100 remains disarmed until UUV 130 reaches the arming threshold speed of 2.5 knots. If the speed signal value is above the arming threshold speed, microcontroller 530 sends a control signal to arm concentric cutting assembly 100 at step 620, if it is not already armed. FIG. 7A illustrates concentric cutting assembly 100 in an armed state with concentric cutters 280 and 290 inside UUV housing 110. The method returns to step 600 to wait for the next speed signal from UUV 130.

When UUV 130 detects an obstacle in its path, its speed will decrease. The same speed sensor used by UUV 130 to measure its speed can also be used for object detection. For instance, when UUV 130 comes into contact with an obstruction, its speed will decrease. Speed changes can be measured and provided to microcontroller 530. A cutting activation threshold speed can be set for the purpose of determining when to deploy concentric cutting assembly 100. It should be appreciated by those skilled in the art that UUV 130 can employ any known method of object detection. At step 630, microprocessor 530 determines whether UUV 130 is traveling at a speed below the cutting activation threshold speed of 2.0 knots.

Figure 7B:
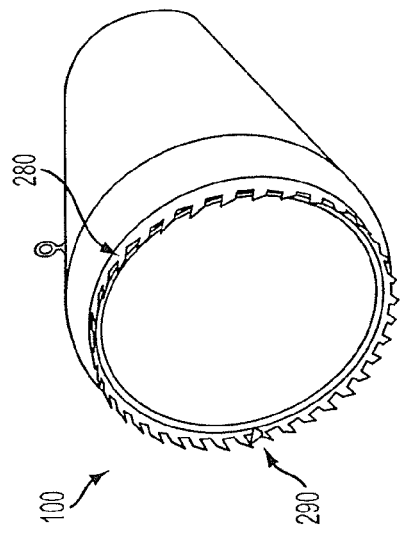
FIG. 7B illustrates a concentric cutting assembly in a deployed state in accordance with an embodiment described herein.

If UUV 130 is traveling at a speed below the cutting activation threshold speed, microcontroller 530 determines whether concentric cutting assembly 100 is armed at step 635. Microcontroller 530 sends a control signal to deploy concentric cutters 280 and 290 at step 640 if concentric cutting assembly 100 is armed. During deployment, concentric cutters 280 and 290 extend out of the forward end of UUV 130 along slide rails 200 as shown in FIG. 7B. At the same time, rotatable cutter 290 starts rotating, preferably in a counter clockwise direction. Rotatable cutter 290 is also preferably rotating at full cutting speed by the time non-rotatable cutter 280 comes into contact with fishing net 750. In this disclosed embodiment, rotatable cutter 290 has a full cutting speed of 100 revolutions per minute (RPM).

At step 650, concentric cutting assembly 100 penetrates through fishing net 750 using concentric cutters 280 and 290. Non-rotatable cutter 280 captures and holds net 750 using at least one fixed teeth 240. The present inventors have discovered that holding the net or other object in place using non-rotatable cutter 280 has two primary benefits. First, UUV 130 is held still with respect to net 750. In other words, rotatable cutter 290 will not cause UUV 130 to rotate. Second, net 750 is held taut which facilitates quicker and easier cutting.

Figure 7C:
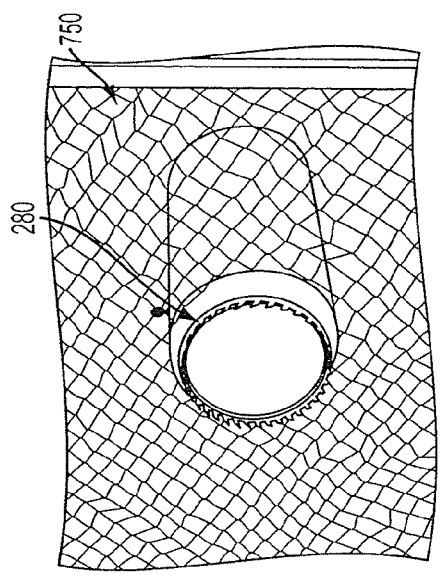
FIG. 7C illustrates a deployed concentric cutting assembly cutting a net in accordance with an embodiment described herein.
Figure 7D:
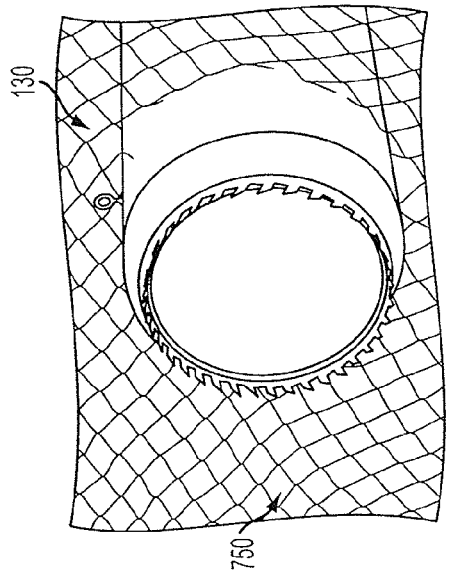
FIG. 7D illustrates a concentric cutting assembly in a retracted state in accordance with an embodiment described herein.

Rotatable cutter 290 rotates for a predetermined length of time, preferably 6 seconds. The length of time should be sufficient for UUV 130 to penetrate net 750 using the shearing action caused by floating teeth 250 sliding against fixed teeth 240. It will be appreciated that the direction of rotation can be clockwise or counter clockwise so long as a bi-directional shearing action results from the rotation. FIG. 7C shows concentric cutting assembly 100 using cutters 280 and 290 to penetrate through fishing net 750.

UUV 130 continues with its mission after cutting net 750. At step 660, concentric cutters 280 and 290 retract into their original positions inside UUV housing 110 along slide rails 200. If desired, concentric cutting assembly 100 may optionally be disarmed at step 660. The process returns to step 600 to wait for the next speed signal from UUV 130.

Disclosed embodiments will simplify and add flexibility to UUV mission planning and execution. UUV operation remains essentially unchanged until an object is detected. Once the object is detected, the concentric cutting assembly will engage the object, penetrate the object, and allow the UUV to carry out its mission with minimal loss of time. Disclosed embodiments allow a greater percentage of missions to be performed with a reduced risk of UUV loss or damage.

The foregoing merely illustrate the principles of the invention. For example, although the concentric cutters of the illustrative embodiments consist of a single non-rotatable cutter and a single rotatable cutter, it is possible for alternative embodiments to incorporate more than one stationary cutter and more than one rotating cutter. In addition, although the floating teeth of the illustrative embodiment have a certain shape, other shapes, materials and configurations are possible. In still other alternative embodiments, UUVs may require a completely autonomous concentric cutting assembly. The concentric cutting assembly in these alternative embodiments can be attached to the outer surface of the UUV and have a separate object detection sensor or speed sensor and an independent power supply. Although the invention may be used to particular advantage in the context of UUVs, those skilled in the art will be able to incorporate the invention into other underwater vehicles, marine vessels, and non-marine systems. It will thus be appreciated that those skilled in the art will be able to devise numerous alternative arrangements that, while not shown or described herein, embody the principles of the invention and thus are within its spirit and scope.

What is claimed as new and desired to be protected by Letters Patent of the United States is:

1. A method of cutting an object by an underwater vehicle using a cutting assembly, the method comprising:
    arming the cutting assembly;
    detecting the object in a path of the underwater vehicle;
    deploying the cutting assembly only if the cutting assembly is armed; and
    cutting the object as the cutting assembly contacts the object.

2. The method of claim 1, wherein detecting the object comprises determining that a speed of the underwater vehicle is below a predetermined cutting activation threshold speed.

3. The method of claim 1, wherein arming the cutting assembly comprises receiving a control signal from a controller.

4. The method of claim 1, wherein arming the cutting assembly comprises determining that a speed of the underwater vehicle is above a predetermined arming speed.

5. The method of claim 3, wherein the predetermined arming speed is between 0 and about 3 knots.

6. The method of claim 5, wherein the predetermined arming speed is about 2.5 knots.

7. The method of claim 4, wherein the speed of the underwater vehicle is determined using a pressure switch.

8. The method of claim 4, wherein the speed of the underwater vehicle is determined using a paddle wheel.

9. A method of cutting an object by an underwater vehicle using a cutting assembly, the method comprising:
  detecting the object in a path of the underwater vehicle, wherein detecting the object comprises determining that a speed of the underwater vehicle is below a predetermined cutting activation threshold speed;
  deploying the cutting assembly; and
  cutting the object as the cutting assembly contacts the object.

10. The method of claim 9, wherein the speed of the underwater vehicle is determined using a speed sensor.

11. The method of claim 9, wherein the speed of the underwater vehicle is determined using a control signal.

12. The method of claim 1, wherein deploying the cutting assembly comprises relative motion between an outer hull of the underwater vehicle and the cutting assembly in a fore-aft direction.

13. The method of claim 1, wherein deploying the cutting assembly comprises extending the cutting assembly toward the object.

14. The method of claim 13, wherein deploying the cutting assembly comprises extending the cutting assembly on at least one slide rail toward the object.

15. A method of cutting an object by an underwater vehicle using a cutting assembly, the method comprising:
  detecting the object in a path of the underwater vehicle;
  deploying the cutting assembly, wherein deploying the cutting assembly comprises relative motion between a plurality of teeth to create a cutting motion;
  wherein the plurality of teeth are formed on at least two concentric blades
  and cutting the object as the cutting assembly contacts the object.

16. The method of claim 15, wherein the cutting motion is sustained for a predetermined length of time.

17. The method of claim 15, wherein the predetermined length of time is about 6 seconds.

18. The method of claim 15, wherein the concentric blades alternate rotating clockwise and counter clockwise for a predetermined time period.

19. A method of cutting an object by an underwater vehicle using a cutting assembly, the method comprising:
  detecting the object in a path of the underwater vehicle;
  deploying the cutting assembly;
  cutting the object as the cutting assembly contacts the object; and
  retracting the cutting assembly.

20. The method of claim 19, further comprising repeating the deploying step after retracting the cutting assembly.

* * * * *